United States Patent
Chen et al.

(10) Patent No.: US 9,513,901 B2
(45) Date of Patent: Dec. 6, 2016

(54) DEPLOYING INCREMENTAL SCRIPTS

(71) Applicant: International Business Machines Corporation, Armonk, NY (US)

(72) Inventors: Xiao Long Chen, Beijing (CN); Na Lv, Beijing (CN); Xi Ning Wang, Beijing (CN); Zhe Yan, Beijing (CN); Zhuo Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/674,017

(22) Filed: Mar. 31, 2015

(65) Prior Publication Data
US 2016/0291968 A1  Oct. 6, 2016

(51) Int. Cl.
*G06F 9/445* (2006.01)
*G06F 9/44* (2006.01)

(52) U.S. Cl.
CPC ..................................... *G06F 8/68* (2013.01)

(58) Field of Classification Search
None
See application file for complete search history.

(56) References Cited

U.S. PATENT DOCUMENTS

| | | | |
|---|---|---|---|
| 5,806,066 A | 9/1998 | Golshani et al. | |
| 6,026,408 A | 2/2000 | Srinivasan et al. | |
| 8,214,393 B2 | 7/2012 | Joshi et al. | |
| 8,250,119 B2 | 8/2012 | Zázrivec et al. | |
| 2004/0064487 A1 | 4/2004 | Nguyen et al. | |
| 2005/0149582 A1 | 7/2005 | Wissmann et al. | |
| 2013/0036328 A1 | 2/2013 | Mutisya et al. | |
| 2013/0117232 A1* | 5/2013 | Lee .................. | G06F 17/30297 707/639 |

FOREIGN PATENT DOCUMENTS

WO  2012034440 A1  3/2012

OTHER PUBLICATIONS

Chen et al., "Deploying Incremental Scripts," U.S. Appl. No. 15/047,148, filed Feb. 18, 2016.
List of IBM Patents or Patent Applications Treated as Related, signed Feb. 18, 2016, 2 pgs.
Atkinson, "How the "migrations" approach makes database continuous integration possible", Apr. 26, 2012, https://www.simple-talk.com/blogs/2012/04/26/how-the-migrations-approach-makes-database-continuous-integration-possible/, accessed on Jan. 8, 2015, 2 pages.
Karmanov, "An Incremental Database Development and Deployment Framework", Feb. 12, 2013, https://www.simple-talk.com/sql/database-administration/an-incremental-database-development-and-deployment-framework/, accessed on Jan. 8, 2015, 8 pages.
Shrag, "DevOps for Everyone: Continuous Deployment and Databases", Apr. 30, 2014, http://drschrag.wordpress.com/2014/04/30/continuous-deployment-and-databases/, accessed on Jan. 8, 2015, 2 pages.

* cited by examiner

*Primary Examiner* — Chuck Kendall
(74) *Attorney, Agent, or Firm* — Erik K. Johnson

(57) ABSTRACT

A method and system of implementing continuous deployment of scripts in languages that only support single deployment. The method and system may develop incremental scripts based on differences between a pending script and an implemented script.

13 Claims, 3 Drawing Sheets

DEPLOYING INCREMENTAL SCRIPTS

BACKGROUND

The present invention relates to deploying incremental scripts, and more particularly to deploying incremental database scripts in a continuous delivery mode.

Continuous delivery (CD) aims to ensure software can be developed, tested, deployed and finally delivered to a production environment in an efficient and safe manner. In CD, the most important part in every change is always considered as a piece of patch and continuously applied to production environment through a specific delivery pipeline. During CD there may be daily builds or deployments occurring throughout the delivery pipeline.

However, traditional installation scripts, such as structured query language (SQL) scripts only support single deployment, rather than continuous deployment. SQL is is a special-purpose programming language designed for managing data held in a relational database management system (RDBMS), or for stream processing in a relational data stream management system (RDSMS). The scope of SQL includes data insert, query, update and delete, schema creation and modification, and data access control. Although SQL is often described as, and to a great extent is, a declarative language (4GL), it also includes procedural elements.

BRIEF SUMMARY

Embodiments of the invention may include a system, method and program product for deploying incremental script updates. A computing device may receive a first script and a second script. The first script is a set of instructions that interacts with a database. The second script is a potential update to the first script. The computing device may create a first set and a second set by comparing the first script and the second script. The first set includes elements that are present in only the second script. The second set includes elements that are present in the first script and the second script. The computing device may classify the first set. Classifying the first set may add metadata tags to the elements of the first set corresponding to the function of the element. The computing device may create a context model that includes at least a portion of the classified first set and the second set. The computing device may create a third script from the context model and deploy the third script as an update to the first script.

BRIEF DESCRIPTION OF THE SEVERAL DRAWINGS

Figure 1:
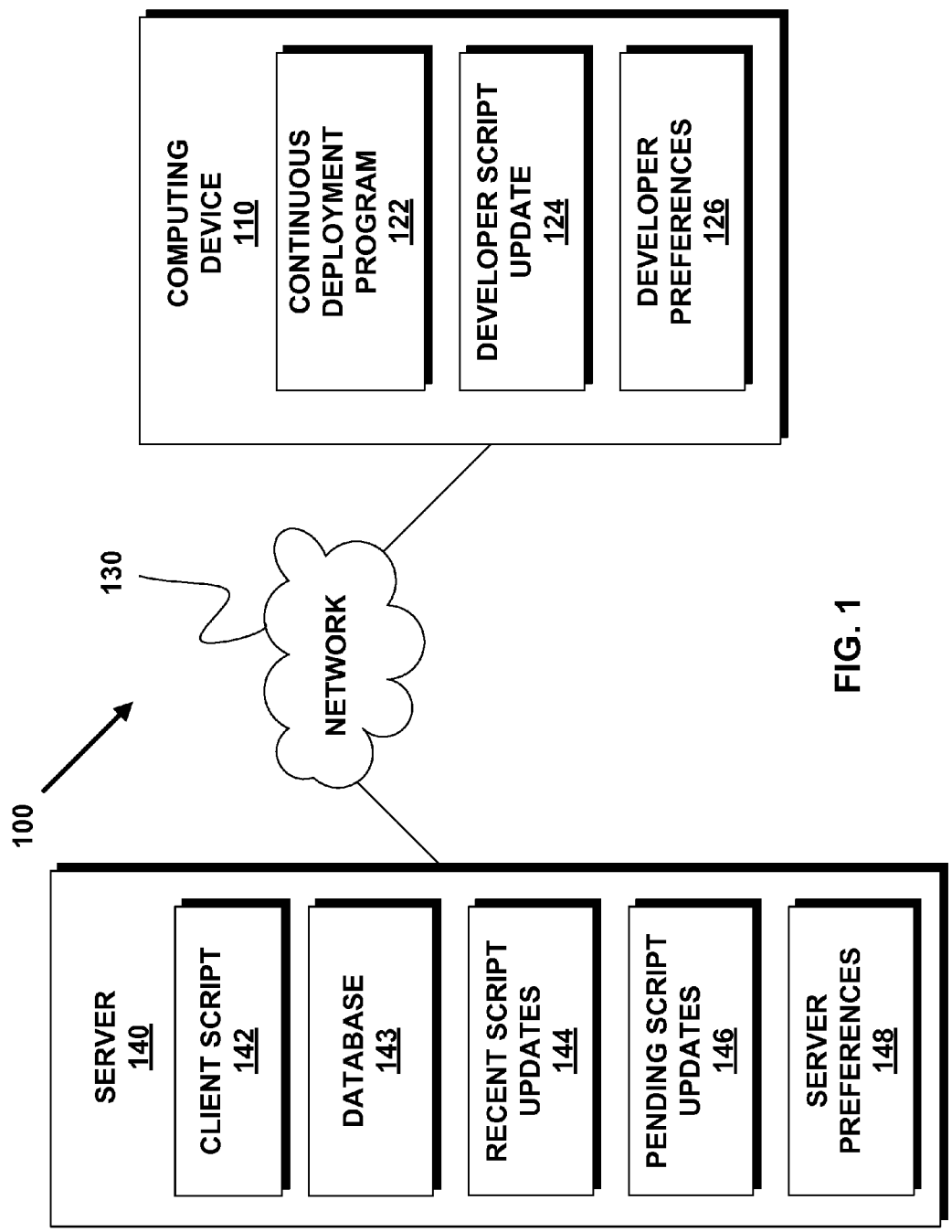
FIG. 1 illustrates a script deployment system, in accordance with an embodiment of the invention.

Elements of the figures are not necessarily to scale and are not intended to portray specific parameters of the invention. For clarity and ease of illustration, dimensions of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

FIG. 1 illustrates script deployment system 100, in accordance with an embodiment of the invention. In an example embodiment, script deployment system 100 includes a computing device 110 and a server 140 interconnected via a network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between the computing device 110 and the server 140.

Server 140 may include a client script 142, a database 143, a recent script updates 144, pending script updates 146 and/or server preferences 148. Server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, server 140 can comprise a cluster of web servers executing the same software to collectively process the requests for the web pages as distributed by a front end server and a load balancer. In the example embodiment, server 140 is a computing device that is optimized for the support of databases, and database scripts, which reside on server 140, such as client script 142, and for the support of network requests related to the databases which reside on server 140. Server 140 is described in more detail with reference to FIG. 3.

Client script 142, recent script updates 144, and pending script updates 146 are collections of files, such as SQL applications and/or database scripts. Database 143 is a collection of information stored on the server 140, and may contain one or more separate databases. In the example embodiment, client script 142 is the script that is deployed, and operating, on server 140. Database 143 represents the information set that client script 142 manipulates or references during operation. Recent script updates 144 are previous script updates that have been incorporated into the client script 142. Pending script updates 146 are script updates, similar to the developer script update 124 mentioned below, that have been sent to the server 140, but have not been incorporated into client script 142. Server preferences 148 is a document detailing requirements for parameters of scripts on server 140, such as required values for table, constraints, column or other operating parameters, which may override pending changes.

Computing device 110 includes continuous deployment program 122, developer script update 124 and developer preferences 126. In the example embodiment, computing device 110 is a desktop computer, a notebook or a laptop computer; however, in other embodiments, computing device 110 may be a smart phone, a tablet computer, a handheld device, a thin client, or any other electronic device or computing system capable of receiving and sending data to and from server 140 via network 130, and capable of developing programs or scripts. Computing device 110 is described in more detail with reference to FIG. 3.

Developer script update 124 is a collection of files including, but not limited to, for example, SQL applications and/or database scripts on computing device 110. In the example embodiment, the developer script update 124 is an update to the client script 142 that is being created, or has been created, on a remote device, such as computing device 120, and has not been sent to the server 140. In the example embodiment, developer preferences 126 is data containing parameters for developing scripts, such as information that details a developers preferred values for table, constraints, column or other operating parameters, which may override pending changes. Developer preferences 126 are described in further detail below with regard to FIG. 2.

Continuous deployment program 122 is a software application or configuration in a software application capable of receiving the client script 142, the recent script updates 144, pending script updates 146 and the server preferences 148 from the server 140 and the developer script updates 124 and developer preferences 126 from the computing device 110 via network 130. In addition, continuous deployment program 122 is capable of combining the pending script updates 146 and the developer script updates 124 to create a single update, and subsequently comparing the created single update to the client script 142, and/or recent script updates 144, to remove any unnecessary elements or command codes from the single update to create an incremental script that would be used to update the client script. In such embodiments, continuous deployment program 122 may be used with languages, such as SQL, that may be prone to errors during updates when unaccounted for alterations have been performed on the scripts and data structures of the client script. By merging the pending updates and parsing out the unnecessary elements or commands, the number of errors that may occur during script updates and data lost from erroneous structure changes may be reduced. While the illustrated embodiment shows the continuous deployment program 122 is located on computing device 110, other embodiments are contemplated where the continuous deployment program 122 is located on server 140. The operations and functions of continuous deployment program 122 are described in further detail below with regard to FIG. 2.

Figure 2:
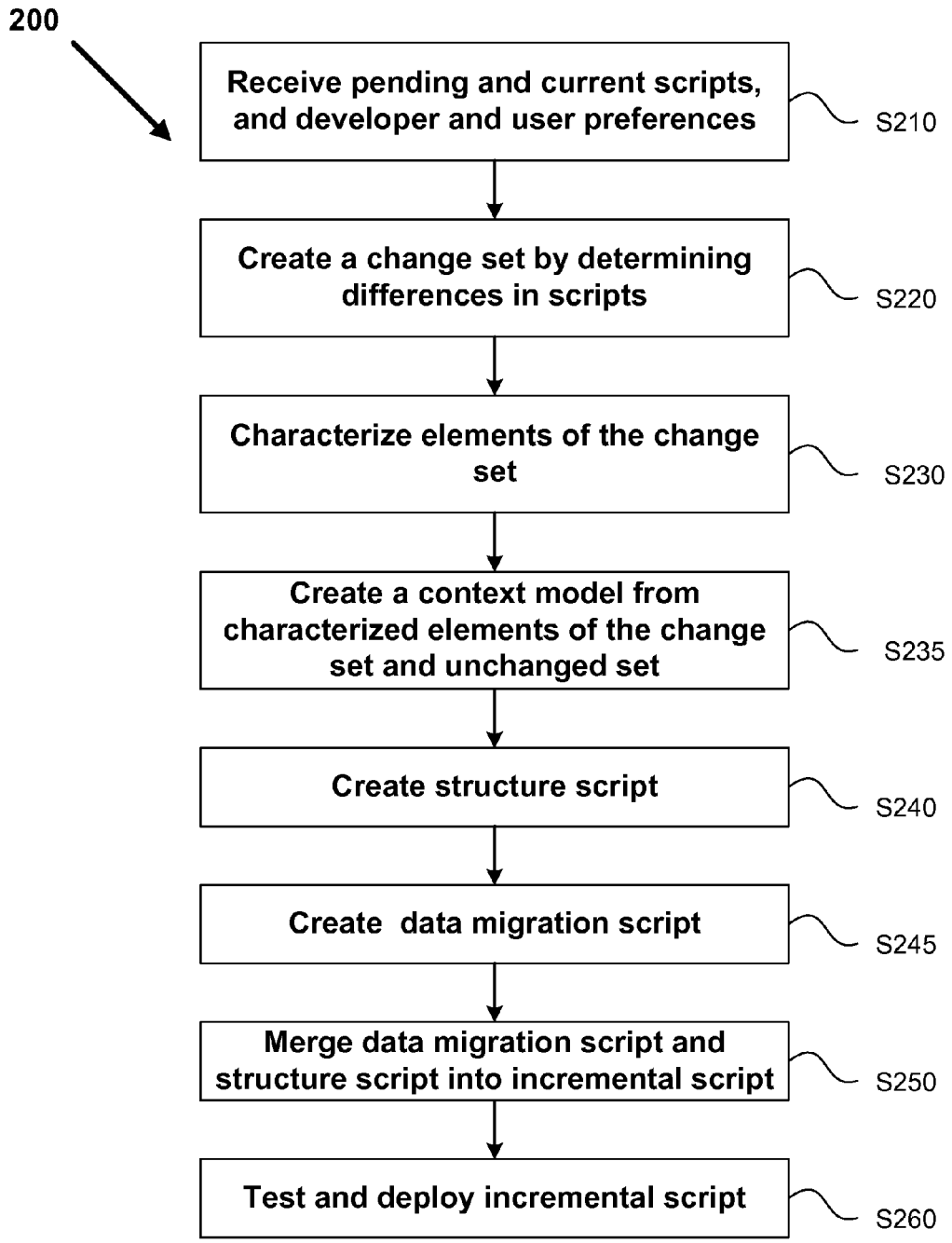
FIG. 2 is a flowchart illustrating the operations of the continuous deployment program of FIG. 1 in creating an incremental script to deploy to a client's script, in accordance with an embodiment of the invention.

FIG. 2 is a flow chart illustrating a method 200 of the continuous deployment program 122, in developing an incremental script to be used to update the client script 142. In the example embodiment, the continuous deployment program 122 receives pending script updates and current scripts, as well as developer preferences and server preferences from server 140 via network 130 (step s210). In the example embodiment, client script 142, recent script updates 144, pending script updates 146 and developer script update 124 are all SQL scripts. Additionally, developer preferences 126 and server preferences 148 are guidelines rules regarding required parameters of databases or scripts, such as, for example, variable constraints, primary keys, or database structural components, and may override changes from the developer script update 124 or pending script updates 146.

The continuous deployment program 122 creates a change set by determining the differences between the client script 142, the recent script updates 144, the pending script updates 146 and the developer script updates 124 (step s220). The continuous deployment program 122 determines the differences and similarities between each script by comparing each command in the client script 142, the recent script updates 144, pending script updates 146 and the developer script updates 124 to determine what is new and what is in the client script 142. In the example embodiment, the comparison may be done by searching for each command of the developer script update 124 and pending script updates 146 in the client script 142 and/or recent script updates 144, to determine if the elements (e.g. commands or groups of commands that perform a specific function) are the same as those that are included in the client script 124, or operations that were previously implemented by recent script updates 144. The continuous deployment program 122 creates an unchanged set that includes the elements from the developer script update 124 and pending script updates 146 that are included in the client script 124, or previously implemented by recent script updates 144. The continuous deployment program 122 creates a change set that includes the elements from the developer script update 124 and pending script updates 146 that are not included in the client script 124, or previously implemented by recent script updates 144. In some embodiments, the continuous deployment program 122 may also look for elements that perform the same result have a different command structure (i.e. a first element that accomplishes the same or a similar task as a second element but is constructed in a different manner may be treated as a similar element).

The continuous deployment program 122 then characterizes the elements contained in the change set of step s220 (step s230). In doing so, continuous deployment program 122 uses the noted changed elements from s220, and determines what types of structural changes occur to the database 143 due to each changed element. The continuous deployment program 122 then tags each element with a metadata tag corresponding to the type of change associated with each element. In the embodiment where the client script 142 is using SQL, the structural changes to database 143 may be classified as table changes, constraint changes and column changes, based on the types of commands contained in the script, and each type of change will be used differently in building the incremental script. For example, when a column is added to a table, the changed element would be tagged with the metadata tag for a column change.

The continuous deployment program 122 then creates a context model based on the characterized change set elements determined in steps s220 and s230, as well as the elements from the unchanged set determined in step s220 (s235). In building the context model, redundant elements, or previously introduced elements, are eliminated in order to reduce resulting errors. In an embodiment, the continuous deployment program 122 may search the change set for multiple instances of the same element. For example, if the change set includes 3 instances of adding column_c to the database, 2 of the redundant instances would be removed. Additionally, in embodiments where server preferences 148 or developer preferences 126 exist, the continuous deployment program 122 determines if the elements in the context violate any of the conditions set by the server preferences 148 or the developer preferences 126 (e.g. data constraints, table constraints, logic), and eliminates any instances of disagreement from the context model. In the example embodiment, the context model contains changed set and unchanged set. The context model includes each of the elements, or commands, that are used to create part of the incremental script, and the elements contain metadata tags describing whether they are new (changed) or already contained in the client script (unchanged). For each of the changed elements, a metadata tag is used that corresponds to the type of change caused by the element. Additionally, the context model does not contain changed elements that conflict with the server preferences 146 or developer preferences 126.

The continuous deployment program 122 then creates a structure script in order to determine the desired database structure (step s240). The continuous deployment program 122 traverses the context model to identify changes to the structure of the database 143. For example, the continuous deployment program 122 identifies changes to the structure of the database 143 by analyzing the metadata tags of elements associated with changes to database structure. In an example embodiment, metadata tags for table or column changes correspond to structure changes. In embodiments where the client script is SQL, the structure script encompasses a list of commands pertaining to the creation or deletion of columns, adding or dropping primary or foreign keys, or other commands that may manipulate the structure of the table.

The continuous deployment program 122 also creates a data migration script to eliminate loss of data due to incompatible data structures (step s245). The step traverses the context model to identify where data migration is necessary and possible in the modified structure of the database 143. In an embodiment, the data migration script ensures that primary keys are not null by auto generating sequential numerical values if the context model contains an instance where a primary key does not contain values. For instance, this may occur when a new primary key is created. In another embodiment, the continuous deployment program 122 creates a data migration script that populates a newly created column with relevant data contained in a column in a different database. This may be done by creating a foreign key chain linking the column to be created in a first table with a column in a corresponding second table to determine what, if any, values may be used to populate the new column. Additionally, conditions may be set to populate unlinked components with non-null values. For example, if column_c is being added to database_1, the data migration program may look for column_c, or a known equivalent column, in a linked database, database_2. If column_c exists in database_2, the values of column_c in database_1 may be populated by values of column_c in database_2 for components that are linked together by a foreign key tag.

The continuous deployment program 122 then merges the data migration script with the structure script to create an incremental script (step s250). The incremental script contains all of the elements of the database migration script and the structure script, and is arranged in a manner that would eliminate errors during operation (e.g. table alterations occur prior to data migration to the table).

The following examples are meant to clarify the development of the incremental script in from the client script 142, the recent script updates 144, the pending script updates 146 and the developer script updates 124, according to steps s220 to s250. In one example, in continuous delivery (CD), scripts may be implemented in incremental segments during development, and thus the developer script update 124 may be based off of a previous version of a client script 142. In such an example, if recent script update 144 contained a command to remove column_c from a data set contained in the client script 142, and developer script update 124 contained a similar command, the continuous deployment program 122 would detect the conflict, and would develop the context model so that an incremental script created from the context model, and introduced into the client script, would not contain the command to remove column_c.

In another example, the continuous deployment program 122 may determine that column_c is no longer present in the tables contained in the client script 142, and would develop a context model so that an incremental script created from the context model, and introduced into the client script, would not contain the command to remove column_c. This would eliminate errors resulting during updates because the implemented script would not be trying to remove a column (or other variable) that no longer existed.

In yet another example, the continuous deployment program 122 may merge pending script updates 146 and the developer script update 124, and compare the merged scripts with the client script 142 to create a context model containing all of the new elements from the pending script updates 146 and the developer script update 124, while eliminating redundant or previously introduced elements. For example, the continuous deployment program 122 may determine that both the developer script update 124 and pending script updates 146 contain a command to remove column_c, and create a context model in which only a single command for the removal of column_c is present.

In an embodiment where there are developer preferences 126 and/or server preferences 148, the context model would eliminate changes that contradict those preferences. For example, if column_c were a necessary component of the client script 142, developer preferences 126 and/or server preferences 148 may create a context model in which the command to remove column_c is not included.

The continuous deployment program 122 then tests and deploys the updated script (step S260). During testing of the client script 142 and the incremental script prior to deployment, the continuous deployment program 122 checks for errors from the resulting combination of scripts by implementing the incremental script into a clone of the client script 142 in an environment that would not lead to corruption of the information on the server. For example, if the incremental script retained a command to eliminate a column that does not exist in the client script 142, the error check would return an error message from the simulated environment, and the incremental script would not be deployed. If no errors are present, the continuous deployment program 122 deploys the incremental script as an update to client script 142. The incremental update only contains the portions of the script that are new to the client script 142, which eliminates issues resulting from repeatedly executing the same script.

Figure 3:
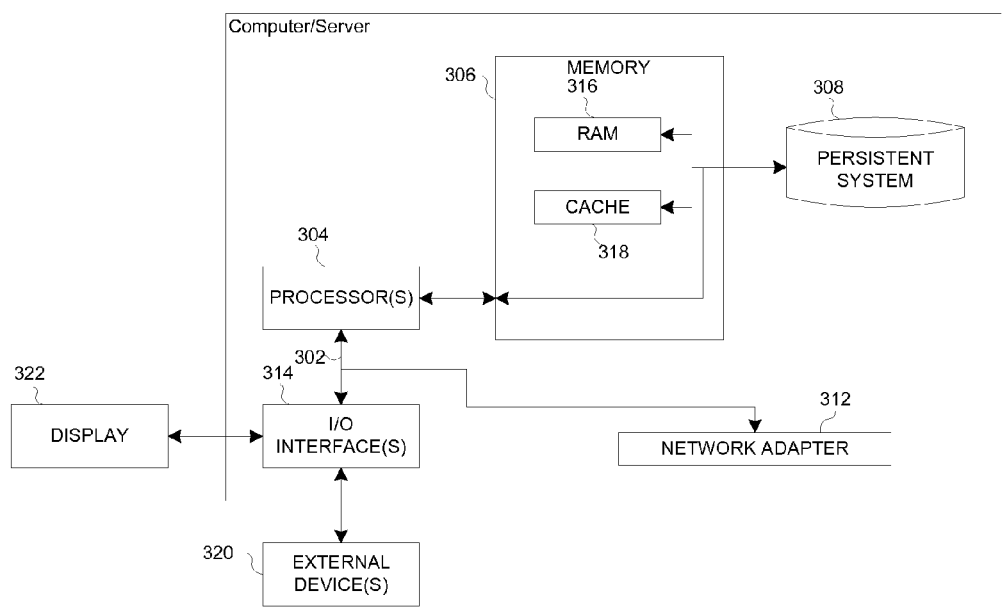
FIG. 3 is a block diagram depicting the hardware components of the script deployment system of FIG. 1, in accordance with an embodiment of the invention.

FIG. 3 depicts a block diagram of components of computing device 110 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs or files continuous deployment program 122, developer preferences 126, developer script updates 124 in computing device 110; and client script 142, recent script updates 144, pending script updates 146 and server preferences 148 in server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs or files continuous deployment program 122, developer preferences 126, developer script updates 124 in computing device 110; and client script 142, recent script updates 144, pending script updates 146 and server preferences 148 in server 140 may be downloaded to persistent storage 308 through communications unit 312.

I/O interface(s) 314 allows for input and output of data with other devices that may be connected to computing device 110 and server 140. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., The programs or files continuous deployment program 122, developer preferences 126, developer script updates 124 in computing device 110; and client script 142, recent script updates 144, pending script updates 146 and server preferences 148 in server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implemented by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer program product for deploying incremental script updates, the computer program product comprising:
one or more computer-readable storage devices and program instructions stored on at least one of the one or more tangible storage devices, the program instructions comprising:
program instructions to receive a first script and a second script, wherein the first script is associated with a database, and wherein the second script is a potential update to the first script;
program instructions to create a first set and a second set by comparing the first script and the second script, wherein the first set includes elements that are present in only the second script, and wherein the second set includes elements that are present in the first script and the second script;
program instructions to classify the elements associated with the first set, wherein program instructions to classify the elements associated with the first set comprise adding metadata tags to the elements associated with the first set corresponding to the function of the element;
program instructions to create a context model, wherein the context model includes the elements and corresponding metadata tags associated with the first set and elements associated with the second set;
program instructions to classify the elements associated with the first set as structural changes to the database;
program instructions to create a data migration script based on the elements classified as structural changes;
program instructions to create a third script from the elements classified as structural changes and the data migration script; and
program instructions to deploy the third script as an update to the first script.

2. The computer program product of claim 1, wherein the first script, the second script and the third script are scripts that utilize the SQL programming language.

3. The computer program product of claim 2, wherein the metadata tags corresponding to the function of the element comprise tags corresponding to table changes, constraint changes or column changes.

4. The computer program product of claim 1, further comprising:
program instructions to generate a fourth script, wherein the fourth script includes at least one element to populate new structural components of the database with values form a linked database; and
program instructions to create the third script from the context model and the fourth script.

5. The computer program product of claim 1, wherein creating the context model further comprises eliminating a first element from the context model based on a disagreement between the first element and a first preference, wherein the first preference is a constraint associated with the database.

6. The computer program product of claim 1, further comprising program instructions to remove duplicative elements contained in the context model.

7. The computer program product of claim 1, further comprising program instructions to test the third script for errors prior to deploying the third script.

8. A computer system for deploying incremental script updates, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive a first script and a second script, wherein the first script is associated with a database, and wherein the second script is a potential update to the first script;
program instructions to create a first set and a second set by comparing the first script and the second script, wherein the first set includes elements that are present in only the second script, and wherein the second set includes elements that are present in the first script and the second script; program instructions to classify the elements associated with the first set, wherein program instructions to classify the elements associated with the first set comprise adding metadata tags to the elements associated with the first set corresponding to the function of the element;
program instructions to create a context model, wherein the context model includes the elements and corresponding metadata tags associated with the first set and elements associated with the second set;
program instructions to classify the elements associated with the first set as structural changes to the database;
program instructions to create a data migration script based on the elements classified as structural changes;
program instructions to create a third script from the elements classified as structural changes and the data migration script; and
program instructions to deploy the third script as an update to the first script.

9. The computer system of claim 8, wherein the first script, the second script and the third script are scripts that utilize the SQL programming language.

10. The computer system of claim 9, wherein the metadata tags corresponding to the function of the element comprise tags corresponding to table changes, constraint changes or column changes.

11. The computer system of claim 8, further comprising:
program instructions to generate a fourth script, wherein the fourth script includes at least one element to populate new structural components of the database with values form a linked database; and
program instructions to create the third script from the context model and the fourth script.

12. The computer system of claim 8, wherein creating the context model further comprises eliminating a first element from the context model based on a disagreement between the first element and a first preference, wherein the first preference is a constraint associated with the database.

13. The computer system of claim 8, further comprising program instructions to remove duplicative elements contained in the context model.

* * * * *